United States Patent Office 3,451,423
Patented June 24, 1969

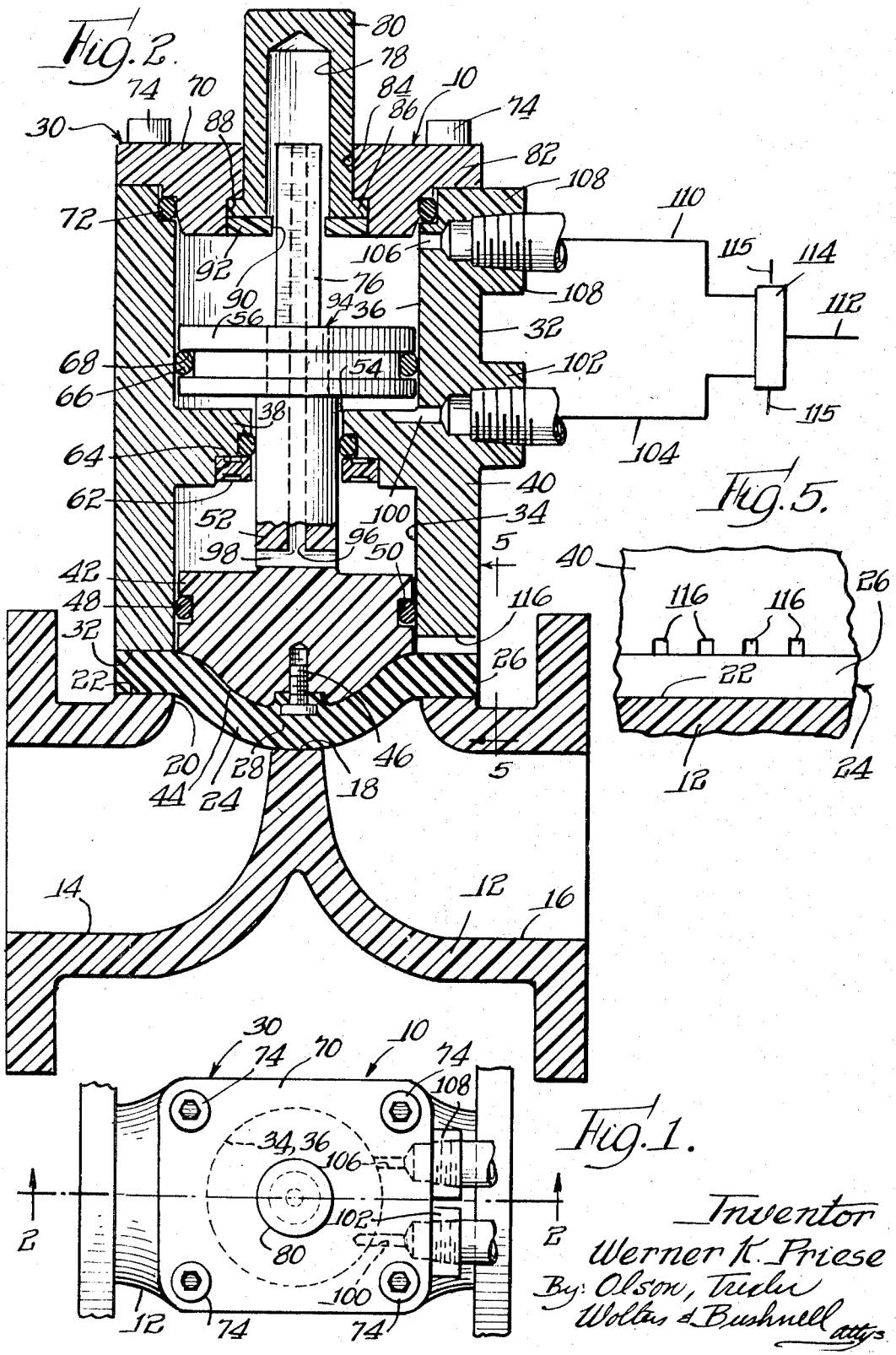

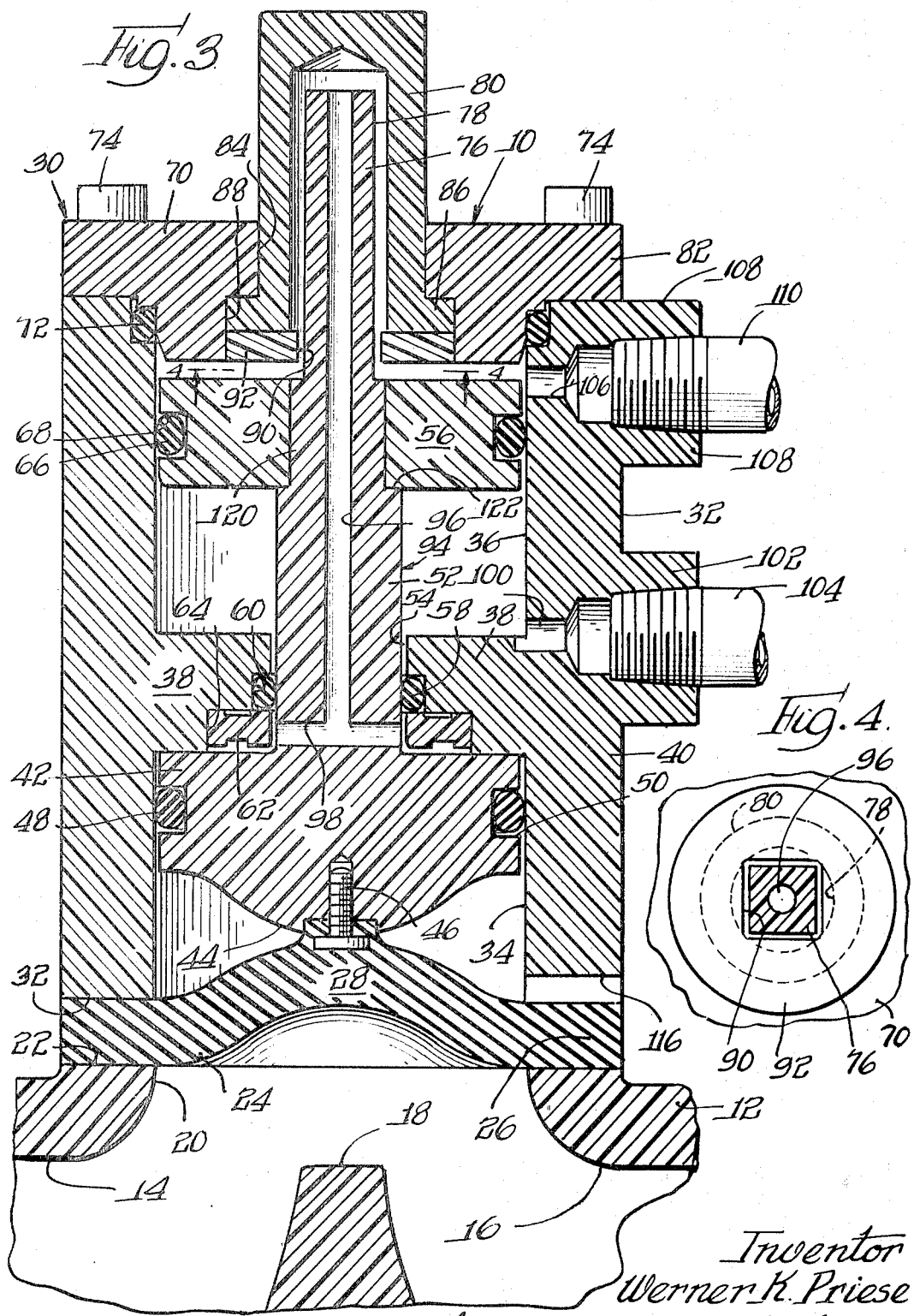

3,451,423
FLUID ACTUATED DIAPHRAGM VALVE
Werner K. Priese, Barrington, Ill., assignor to Hills-McCanna Company, Carpenterville, Ill., a corporation of Delaware
Filed Dec. 15, 1967, Ser. No. 690,910
Int. Cl. F16k 37/00, 7/12, 31/143
U.S. Cl. 137—556
4 Claims

ABSTRACT OF THE DISCLOSURE

A fluid actuated diaphragm valve in which a diaphragm is secured to a hollow body in opposing relation to a weir by a bonnet containing two tandem pistons forming a movable compressor assembly which acts directly on the diaphragm to move the latter toward the weir with the cumulative force of fluid pressure on both pistons and which pulls the diaphragm away from the weir with the force of fluid pressure on one piston, the instantaneous position of the diaphragm being continuously manifest visually.

---

The present invention relates to self-contained diaphragm valves operated by external sources of fluid under pressure, usually compressed air.

Diaphragm valves that can be operated by fluid under pressure have been the object of considerable developmental effort because of the many advantages that can be derived from the installation and use of the valves. Such valves are well adapted to be controlled locally or by remote control apparatus that can be of simple construction and of any of many commercially available designs. Moreover, sources of compressed air or other pressurized fluid that can be expended for valve operation are usually available already in environments where it is desirable to use the valves.

Despite their inherent advantages, the many fluid actuated diaphragm valves hitherto devised in the prior art have, nevertheless, been marked by various significant shortcomings which are the concern of this invention. Many prior valves actuated by fluid pressure have been unduly expensive in relation to the cost that can be justified in some types of service where the operating capabilities of such valves could be employed to advantage. Other valves designed to be energized by fluid under pressure will not necessarily function with assured reliability in service with resulting possibilities of malfunctioning with more or less serious consequences.

Another troublesome characteristic common in prior valves is the unsuitability of such valves for producing optimum valve opening and closing forces from the pressure of available operating fluids.

One object of the invention is to provide a fluid actuated diaphragm valve having an improved construction which achieves at once, in relation to prior valves, a marked and highly significant reduction in the inherent cost of manufacturing the improved valve and most significant operating advantages in service, including assured dependability in both opening and colsing of the valve by optimum forces produced by the pressure of the valve actuating fluid.

A further object is to provide a fluid actuated diaphragm valve which continuously manifests visually a highly conspicuous indication of the instantaneous position of the valve diaphragm so that the operator can determine positively by a mere glance at the valve the exact instantaneous operational condition of the valve in realtion as to whether or not it is open or closed either fully or partially.

Another object is to provide a valve according to the preceding objects which has a serviceability that is extended into new environments, including those which justify only limited expenditures for equipment by virtue of the construction of the improved valve that makes possible construction of the valve at a most favorable cost while at the same time assuring reliable opening and closing of the valve by optimum forces produced by operating fluid pressure.

Another object is to provide a valve of the character recited in the preceding objects which is well adapted to be constructed from a rather small number of parts that can be molded from plastics materials and assembled together, the valve being at the same time susceptible of manufacture optionally from metal and other materials.

Another object is to provide an improved valve as recited in the preceding objects which is inherently well adapted to be readily and easily serviced in the event it becomes necessary to replace the valve diaphragm.

Other objects and advantages will become apparent from the following description of the exemplary embodiment of the invention illustrated in the drawings in which:

FIG. 1 is a plan view of the valve forming the exemplary embodiment of the invention illustrated;

FIG. 2 is a vertical, longitudinal section view, on a somewhat enlarged scale, of the valve taken generally with reference to the line 2—2 of FIG. 1, and showing the relative positions of the parts when the valve is closed;

FIG. 3 is a view similar to the major portion of FIG. 2 but made on a larger scale and illustrating the relative positions of the parts when the valve is open;

FIG. 4 is a fragmentary sectional view taken with reference to the line 4—4 in FIG. 3; and FIG. 5 is a fragmentary sectional view taken with reference to line 5—5 in FIG. 3.

Referring to the drawings in greater detail, the valve 10 forming the exemplary embodiment of the invention illustrated comprises a hollow valve body 12 adapted at opposite ends to be connected with conduits (not shown) and defining two flow passages 14, 16 extending inwardly to a raised flow control weir 18 extending transversely in relation to the passages 14, 16 between the adjacent inner ends of the passages, as illustrated in FIGS. 2 and 3.

The body 12 defines in one lateral side of the body an opening 20, FIGS. 2 and 3, exposing laterally the weir 18 and the adjacent inner ends of both passages 14, 16, the opening being encircled by a diaphragm supporting marginal edge 22 of the body 12. A flexible flow control diaphragm 24 formed largely of a yieldable polymeric material and having a construction that may be provided by those skilled in the art is disposed in covering relation to the lateral body opening 20 with the marginal edge 26 of the diaphragm supported on the marginal edge 22 of the body as illustrated in FIGS. 2 and 3.

In the preferred construction illustrated, the diaphragm 24 has a generally rectangular shape over all as viewed from one side and has a normally dished and flexible central portion 28 adapted to be flexed toward and away from the weir 18 to effect closing and opening of the valve.

The marginal edge 26 of the diaphragm 24 is securely held against its supporting marginal edge 22 on the body 12 by the inner edge of the valve bonnet indicated generally by the number 30. The external transverse shape of the bonnet 30 is generally rectangular with slightly rounded corners as illustrated in FIG. 1, conforming generally to the corresponding size and shape of the diaphragm 24 so that the inner edge 32 of the hollow bonnet fits against the marginal edge 26 of the diaphragm as illustrated in FIGS. 2 and 3.

More particularly, the bonnet 30 comprises a hollow bonnet body 32 having a generally rectangular external shape, as illustrated in FIGS. 1, 2 and 3, and defining internally two power cylinders 34, 36 of substantially equal diameter opening outwardly through the inner and outer ends of the body 32 in coaxial relation to each other. Adjacent ends of the inner power cylinder 34 and the outer power cylinder 36 are partitioned or separated from each other by an annular partition member or wall 38 integral with the peripheral wall 40 of the bonnet body 32 and extending radially inward as illustrated in FIGS. 2 and 3.

The inner power cylinder 34 confronts endwise the diaphragm 24 and contains a circular diaphragm actuating element 42 which serves, as will presently appear, the dual functions of a fluid power actuating piston and a diaphragm compressor. The inner face of the inner diapragm actuating element 42 is shaped, as illustrated in FIGS. 2 and 3, to form a convex diaphragm compressor face 44 which acts in compression directly on the outer surface of the diaphragm 24 to flex the central portion 28 of the diaphragm inwardly into engagement with the weir 18 to close the valve as will presently appear.

A threaded diaphragm retracting element 46 anchored in the central diaphragm portion 28 is threaded into the center of the compressor face 44 of the inner diaphragm actuating element 42 to forcibly pull the flexible center portion of the diaphragm away from the weir 18 to open the valve as an incident to fluid powered retraction of the power actuating element 42 in a manner to be described.

An O-ring seal 48 carried in a peripheral groove 50 in the inner diaphragm actuating element 42 slidably engages the inner surface of the cylinder 34 to form a continuous slidable seal between the element 42 and the bonnet cylinder 34 Since the power operated inner diaphragm actuating element 42 functions both as a fluid power piston and a diaphragm compressor, as will appear, it may be sometimes referred to correctly in the ensuing description, where appropriate, as being either the inner power piston or the diaphragm compressor.

A piston rod 52 connected with the central portion of the inner piston and compressor element 42 extends axially outward through a central opening 54 in the annular partition 38 and connects with the center of a second fluid power piston 56 slidably disposed in the outer power actuating cylinder 36.

An O-ring seal 58 is held in a bore 60 in the inner periphery of the partition 38 by a retaining ring 62 seated in a counterbore 64 and slidably engages the translatable connecting rod 52, which is cylindrical, to form between the partition 38 and the connecting rod 52 a seal which effectively isolates the adjacent ends of the power cylinders 34, 36 from each other.

An O-ring seal 66 carried in a groove 68 in the periphery of the outer piston 56 forms a slidable seal between the piston 56 and the cylindrical wall of the cylinder 36.

A removable cap 70, forming a part of the bonnet 30, is seated in covering relation to the outer end of the bonnet body 32 and sealed to the body 32 in this instance by an O-ring cap seal 72.

Four long cap screws 74, FIGS. 1 to 3, extend through the four corners of the cap 70 and reach through the four corners of the bonnet body 32 and through the four corners of the diaphragm 24 and thread into the underlying valve body 12 to function at once to hold the bonnet cap on the bonnet body and to hold the bonnet body 32 against the diaphragm marginal edge 26 so that the later continuously seals against its suporting marginal edge 22 on the body 12.

Rotation of the inner piston and compressor element 42 is positively precluded and the instantaneous position of the diaphragm 24 is continuously manifest visually to a viewer by means of an outward extension 76 of the connecting rod 52, extending axially outward from the center of the outer power piston 56 as shown in FIGS. 2 and 3.

When the valve is open as illustrated in FIG. 3, a condition which will be more fully described presently, the connecting rod extension 76 projects outwardly, as shown in FIG. 3, beyond the bonnet cap 70 into inwardly opening indicator space 78 dimensioned and positioned to accommodate the extension or indicator 76 and being formed within a transparent window element 80 anchored in the main body 82 of the cap 70 and projecting outwardly beyond the cap body 82 as illustrated.

The window element 80 can be formed to advantage from a transparent plastics material such, for example, as transparent acrylic resin commercially available as "Lucite." A plastics material suitable for the construction of the window element 80 is commercially available under the trademark "Methacrylate."

As shown, the window element 80 defining the internal indicator space 78 has a generally cylindrical form over all and is anchored in a bonnet cap bore 84 by a flange 86 on the element 80 seated in a counterbore 88.

As illustrated in FIG. 4, the connecting rod extension 76 forming the indicator denoted by the same reference number is squared in its external shaping and extends through a square opening 90 of generally similar shape but somewhat larger size formed in a guide washer 92 seated nonrotatably in the cap counterbore 88 inwardly of the window element 80 as shown.

Since the squared connecting rod extension forming the indicator element 76 connects nonrotatably with the inner piston and compressor element 42 that is in turn connected by the threaded element 46 with the nonrotatable diaphragm 24, there is no tendency for the movable power assembly including the connecting rod 52 and pistons 42, 56 to rotate in operation. Nevertheless, the positional relationship of the squared indicator element 76 to the squared opening 90 in the nonrotatatable guide washer 92 serves to positively preclude significant rotation of the movable assembly, indicated generally by the reference number 94, and thus providing positive assurance against unthreading of the piston and compressor element 42 from the threaded diaphragm retracting element 46 anchored in the diaphragm 24.

The indicator accommodating space 78 within the window element 80 is preferably circular in transverse shape and has a size in transverse shape exceeding that of the squared guide washer opening 90 to provide assurance against scoring of the window element 80 by the indicator 76.

The size of the anchor washer opening 90 in transverse section and the size of the indicator accommodating space 78 in transverse section are made sufficiently larger in size than the corresponding transverse size of the indicator 76 that continuous communication is provided for the passage or fluid axially along the indicator 76 between the outer end of the outer power cylinder 36 and the indicator accommodating space 78 at the outer end of the indicator 76.

An axial bore 96 is formed centrally in the connecting rod 52 and the indicator extension 76 of the connecting rod to extend from the outer end of the indicator 76 in the space 78 to the juncture of the connecting rod 52 with the inner power piston and compressor 42 where the axial bore 96 connects with a transverse bore 98 formed in the connecting rod 52 adjacent the outer face of the inner piston and compressor element 42 and provides in this manner continuous communication for the passage of fluid between the outer end of the power cylinder 34 and the space 78 which continuously communicates as previously described with the outer end of the outer power cylinder 36.

The peripheral wall 40 of the bonnet body 32 defines a passage 100 for valve opening fluid, FIGS. 1, 2 and 3, communicating at its inner end with the inner end of the outer power cylinder 36 and connected with an external coupling element 102 on the bonnet wall 40 adapted to receive a conduit 104 for controlling fluid, represented diagrammatically in FIG. 2. Similarly, the valve body wall 40 defines a passage 106 for valve closing fluid communicating at its inner end with the outer end of the power cylinder 36 and connecting with an external coupling 108 on the bonnet wall 40 which receives a conduit 110 for control fluid, indicated diagrammatically in FIG. 2.

A source of valve operating fluid under pressure, represented diagrammatically in FIG. 2 by a compressed air supply line 112, is connected to the valve opening passage 100 and to the valve closing passage 106 alternately by suitable control means represented diagrammatically, for purposes of illustration, in FIG. 2, by a spool valve 114 functioning as both a fluid supply and exhaust and being controlled either locally or by remote control apparatus of any character desired. The control means 114, depicted diagrammatically as a control valve, functions as an incident to connecting either of the passage 100, 106 to the supply line 112 of pressurized operating fluid to simultaneously connect the other of the passages 100, 106 to drain or exhaust, represented diagrammatically in FIG. 2 by outlets 115.

Having reference to FIG. 5 and to FIG. 2, a portion of the inner edge of the bonnet body wall 40 is serrated adjacent the diaphragm 24 to form a pluarlity of narrow breather vents 116 connecting the inner end of the cylinder 34 with the ambient atmosphere to allow air to flow or breathe into and out of the inner end of the inner cylinder 34 inwardly of the piston and compressor element 42 as an incident to opening and closing of the valve as will presently appear.

Upon operation of the control means 114 to supply operating fluid under pressure to the valve opening passage 100 and to connect the valve closing passage 106 to exhaust, operating fluid under pressure enters the inner end of the outer power cylinder 36 to act on the inner face of the outer power piston 56 to move the assembly 94 comprising the outer power piston 56, the inner piston and compressor element 42, the connecting rod 52 and indicator 76 outwardly to positively retract the diaphragm 24 away from the weir 18 with a force equal to that of the operating fluid pressure on the inner face of the piston 56 to assure opening of the valve.

Such outward movement of the movable assembly 94 from the valve closed position illustrated in FIG. 2 to the valve open position illustrated in FIG. 3 is accompanied by the inhalation of air through the breather vents 116 into the inner end of the inner cylinder 34 behind the compressor element 42 and by the simultaneous discharge of operating fluid from the outer ends of both the inner cylinder 34 and the outer cylinder 36. Thus, fluid in the outer end of the inner cylinder 34 is exhausted through the passages 98 and 96 in the connecting rod 52 and its indicator extension 76 into the outer space 78 from where it flows longitudinally around the indicator 76 into the outer end of the cylinder 36 where it comingles with fluid in the cylinder 36 and is exhausted through the passage 106 then connected to exhaust or drain.

As an incident to outward valve opening displacement of the assembly 94 by the force of operating fluid pressure on the outer piston 56, the indicator element 76, which may have a red or otherwise conspicuous color, moves out into the indicator accommodating space 78 where it is clearly visible in its extended position through the transparent window element 80 so that the observer is alerted visually by a glance at the valve that it is open, the indicator 76 as viewed through the window element 80 providing visually a positive registration of the instantaneous position of the valve diaphragm 24.

Upon operation of the control means 114 to connect the source of operating fluid under pressure to the valve closing passage 106 and to simultaneously connect the valve opening passage 100 to exhaust, operating fluid under pressure flows through the passage 106 into the outer end of the outer power cylinder 36 to pressurize the outer face of the outer power piston 56 and simultaneously flows around the indicator 76 into the space 78 and through the bores 96 and 98 in the connecting rod 52 into the outer end of the inner power cylinder 34 to simultaneously pressurize the outer face of the inner piston and compressor element 42.

The inward force of operating fluid on the outer piston 56 acts cumulatively with the inward force of operating fluid pressure on the inner piston and compressor element 42 to displace the movable assembly 94 inwardly causing the convex face 44 of the element 42 to flex the diaphragm into engagement with the weir 18 to close the valve.

This valve closing movement of the fluid actuated assembly 94 is accompanied by a concurrent exhaustion of operating fluid from the inner end of the outer cylinder 36 through the passage 100 then connected to exhaust or drain and by the exhaling of air from the inner end of the inner cylinder 34 through the breather vents 116 as the assembly 94 acts under fluid pressure to close the valve.

At this point, it will be noted with reference to FIG. 2 that valve closing movement of the assembly 94 under the force of fluid pressure on both pistons 56 and 42 effects a retraction of the indicator element 76 substantially out of the visual field of the transparent window element 80, the outer extremity of the indicator 76 preferably being generally flush with the base structure 82, which is opaque, of the bonnet cap 70 so that the visual absence of the indicator element 76 in the window member 80 provides positive assurance that the valve is closed.

It will be appreciated that closing of the valve requires the application to the diaphragm 24 of sufficient closing force to not only flex the diaphragm inwardly but also to overcome the forces of fluid pressure in both valve passages 14, 16 on the diaphragm 24. Such valve closing force is readily generated within the improved valve 10 even when supplied with operating fluid under only moderate pressure by virtue of the cumulative action of the operating fluid pressure in a valve closing direction on three piston areas in the valve described, which piston areas are the outer face of the inner piston and compressor element 42, the outer face of the outer piston 56 and the outer end of the indicator element 76, all of which are exposed to the pressure of operating fluid admitted through the valve closing passage 106 as described.

Opening of the valve requires in general only sufficient force to effect outward flexing of the diaphragm 24 away from the weir 18, but on account of the substantial resistance which the diaphragm may have to flexing, a substantial outward force may be required to assure opening of the valve by outward flexing of the diaphragm 24. Optimum valve opening force for this purpose is provided by the force of fluid pressure acting on only the inner face of the outer piston 56, the valve opening force thus being generated in the valve positively by operating fluid pressure, but being restricted radically in strength in relation to the generated valve closing force so that both the valve opening force and the valve closing force are correlated with the valve closing and opening forces required inherently to effect reliable operation of the valve.

It should be noted that the valve described is constructed of a very limited number of parts, the construction being well adapted for formation and assembly of substantially all components of the valve described from plastics materials to advantage.

The bonnet body 32, bonnet cap 70, guide washer 92 and retaining ring 62 can all be molded individually from a plastics material of suitable physical properties such, for example, as acrylonitrile-butadiene-styrene copolymer. Such a plastic material is available commercially under the trademark "Cycolac." The inner piston and compressor element 42 can be molded integrally with the connecting rod 52 and its indicator extension 76 from the same materials as can the outer piston 56.

As shown in FIGS. 2 and 3, the outer piston 56 is fitted around a connecting rod segment 120 to rest against an annular shoulder 122 on the connecting rod 52 which positively precludes inward movement of the piston 56 along the connecting rod 52. The piston 56 and connecting rod 52 are rigidly and permanently secured together preferably by cementing. Also, the guide washer 92 and the retaining ring 62 can be rigidly secured in place by cement.

To replace the diaphragm 24 after the valve has been in service, it is necessary only to remove the cap screws 74 releasing the bonnet 10 from the body 12 and then detach the worn diaphragm from the piston and compressor element 42, which is effected by turning the diaphragm 24 in relation to the element 42. In a similar manner, a new diaphragm is attached to the element 42 and the new diaphragm and bonnet are reassembled onto the body 12.

The invention is claimed as follows:

1. A weir valve comprising, in combination, a valve body defining two flow passages opening thereinto from opposite sides thereof and defining a weir element disposed between the inner ends of said passages in transverse relation thereto, said body defining in one side thereof an opening exposing said weir element and adjacent inner ends of both said passages, said body having a marginal edge encircling said body opening, a flexible flow control diaphragm confronting said weir element for movement toward and away from the latter and having a marginal edge supported on said marginal edge of the body, a bonnet removably secured to said body in covering relation to said opening, said bonnet saving on the inner portion thereof means holding the marginal edge of said diaphragm against said marginal edge of the body, said bonnet defining an inner power cylinder generally perpendicular to said diaphragm and having an inner end confronting the diaphragm, an inner power piston slidably mounted in said inner cylinder and having a peripheral seal slidably engaging the inner wall of the cylinder to form a slidable seal therewith, the inner side of said inner power piston defining a convex compressor face confronting said diaphragm to operate thereagainst, means securing the central portion of said diaphragm to the center of said compressor face, said bonnet defining an outer power cylinder spaced outwardly from said inner power cylinder in coaxial relation to the latter, an outer power piston slidably disposed in said outer power cylinder and having a peripheral seal slidably engaging the inner wall of said outer power cylinder, a piston rod extending axially between and being connected with the central portions of both said pistons, said bonnet having an annular partition element intervening between said power cylinders and extending with respect to said piston rod radially inward, a seal supported by said partition element and slidably engaging said piston rod to form a seal therewith, said bonnet defining a valve opening fluid passage adapted to be connected with a source of operating fluid under pressure and communicating with the inner end of said outer power cylinder inwardly of said outer power piston to effect by fluid pressure an outward valve opening displacement of said outer power piston, said bonnet defining a valve closing fluid passage adapted to be connected with a source of operating fluid under pressure and communicating with the outer end of said outer power cylinder outwardly of said outer power piston, an indicator element movable with said outer power piston extending outwardly therefrom in generally parallel relation to said power cylinders, said bonnet having a hollow window element formed of transparent material and defining an externally visible internal space opening inwardly into said outer power cylinder in alignment with said indicator element to accommodate outward movement of the latter incident to opening of the valve whereby the presence of said indicator element as viewed through the window element continuously indicates the instantaneous operating condition of the valve, said indicator element being dimensioned with respect to said internal space in said window element to provide continuous fluid communication between the outer portion of said window space and the outer end of said outer power cylinder, said indicator element and said piston rod defining a passage for valve closing fluid extending from said window space into said inner power cylinder at the outer side of said inner power piston whereby the outer portions of said inner and outer power cylinders are in continuous communication with each other so that the forces of fluid pressure on the outer faces of both power pistons work cumulatively to force said compressor face on the inner side of said inner power piston against said diaphragm to force the diaphragm against said weir element to close the valve, and said bonnet defining a breather passage continuously connecting the inner end of said inner power cylinder to the ambient atmosphere for permissive breathing of the inner end of the power cylinder as an incident to opening and closing of the valve.

2. A weir valve comprising, in combination, a valve body defining two flow passages opening thereinto from opposite sides thereof and defining a weir element disposed between the inner ends of said passages in transverse relation thereto, said body defining in one side thereof an opening exposing said weir element and adjacent inner ends of both said passages, said body having a marginal edge encircling said body opening, a flexible flow control diaphragm confronting said weir element for movement toward and away from the latter and having a marginal edge supported on said marginal edge of the body, a bonnet removably secured to said body in covering relation to said opening, said bonnet having on the inner portion thereof means holding the marginal edge of said diaphragm against said marginal edge of the body, said bonnet defining an inner power cylinder having an inner end confronting the diaphragm, a translatable valve actuating assembly housed within said bonnet and comprising an inner power piston slidably disposed in said inner cylinder, the inner side of said inner power piston defining a convex compressor face confronting said diaphragm to operate thereagainst, means securing the central portion of said diaphragm to the center of said compressor face, said bonnet defining an outer power cylinder spaced outwardly from said inner power cylinder in parallel relation to the latter, said translatable assembly including an outer power piston slidably disposed in said outer power cylinder and a common piston rod connecting both said pistons, said bonnet having an annular partition element intervening between said power cylinders and encircling said piston rod, a seal supported by said partition element and slidably engaging said piston rod to form a seal therewith, said bonnet defining a valve opening fluid passage adapted to be connected with a source of operating fluid under pressure and communicating with the inner end of said outer power cylinder inwardly of said outer power piston to effect by fluid pressure an outward valve opening displacement of said translatable assembly, said bonnet defining a valve closing fluid passage adapted to be connected with a source of operating fluid under pressure and communicating with the outer end of said outer cylinder outwardly of said outer power piston, an indicator element movable with said outer power cylinder and extending outwardly therefrom in generally parallel relation to said power cylinders, said bonnet having a hollow window element formed of transparent material and defining an externally visible internal space opening inwardly into said outer power cylinder in alignment with said indicator element to accommodate outward movement of the latter incident to opening of the valve whereby the visible presence of said indicator element in said window element continuously indicates the instantaneous operating condition of the valve, said translatable assembly defining a passage for valve closing fluid continuously connecting the outer portions of said inner and outer power cylinders so that the forces of fluid pressure on the outer faces of both power pistons work cumulatively to force said translatable assembly inward to effect closing of the valve, and said bonnet defining a vent passage continuously connecting the inner end of said inner power cylinder to the ambient atmosphere for permissive breathing of the inner end of the power cylinder as an incident to opening and closing of the valve.

3. A weir valve comprising, in combination, a valve body defining two flow passages opening thereinto from opposite sides thereof and defining a weir element disposed between the inner ends of said passages in transverse relation thereto, said body defining in one side thereof an opening exposing said weir element and adjacent inner ends of both said passages, a flexible flow control diaphragm confronting said weir element for movement toward and away from the latter and having a marginal edge supported on said body, a bonnet removably secured to said body in covering relation to said opening and having means thereon securing the marginal edge of said diaphragm to said body, said bonnet defining an inner power cylinder having an inner end confronting the diaphragm, a translatable valve actuating assembly housed in said bonnet and comprising an inner power piston slidably disposed in said inner cylinder, means on the inner side of said inner power piston including means confronting said diaphragm to operate thereagainst to force the diaphragm against said weir element to close the valve, means securing the central portion of said diaphragm to said inner power piston, said bonnet defining an outer power cylinder spaced outwardly from said inner power cylinder in parallel relation to the latter, said translatable assembly including an outer power piston slidably disposed in said outer power cylinder and a common piston rod connecting both said pistons, said bonnet having an annular partition element intervening between said power cylinders and encircling said piston rod in a sealed slidable relationship thereto, said bonnet defining a valve opening fluid passage adapted to be connected with a source of operating fluid under pressure and communicating with the inner end of said outer power cylinder inwardly of said outer power piston to effect by fluid pressure an outward valve opening displacement of said translatable assembly, said bonnet defining a valve closing fluid passage adapted to be connected with a source of operating fluid under pressure and communicating with the outer end of said outer power cylinder outwardly of said outer power piston, and said translatable assembly defining a passage for valve closing fluid continuously connecting the outer portions of said inner and outer power cylinders so that the forces of fluid pressure on the outer faces of both power pistons work cumulatively to force said translatable assembly inward to effect closing of the valve.

4. A weir valve comprising, in combination, a valve body defining two flow passages opening thereinto from opposite sides thereof and defining a weir element disposed between the inner ends of said passages in transverse relation thereto, said body defining in one side thereof an opening exposing said weir element and adjacent inner ends of both said passages, a flexible flow control diaphragm confronting said weir element for movement toward and away from the latter and having a marginal edge supported on said body, a bonnet removably secured to said body in covering relation to said opening and including means securing the marginal edge of said diaphragm to said body, said bonnet defining an inner power cylinder having an inner end confronting the diaphragm, a translatable valve actuating assembly housed in said bonnet and comprising an inner power piston slidably disposed in said inner cylinder, the inner side of said inner power piston including means coacting with the central portion of said diaphragm to move the latter toward and away from said weir element to close and open the valve, said bonnet defining an outer power cylinder spaced outwardly from said inner power cylinder in parallel relation to the latter, said translatable assembly including an outer power piston slidably disposed in said outer power cylinder and a common piston rod connecting both said pistons, said bonnet having an annular partition element intervening between said power cylinders and encircling said piston rod in a sealed slidable relationship thereto, said bonnet defining a valve opening fluid passage adapted to be connected with a source of operating fluid under pressure and communicating with the inner end of said outer power cylinder inwardly of said outer power piston to effect by fluid pressure an outward valve opening displacement of said translatable assembly, said bonnet defining a valve closing fluid passage adapted to be connected with a source of operating fluid under pressure and communicating with the outer end of said outer power cylinder outwardly of said outer power piston, an indicator element movable with said outer power piston and extending outwardly therefrom in generally parallel relation to said power cylinders, said bonnet having a hollow window element formed of transparent material and defining an externally visible internal space opening inwardly into said outer power cylinder in alignment with said indicator element to accommodate outward movement of the latter incident to opening of the valve whereby the visible presence of said indicator element in said window element continuously indicates the instantaneous operating condition of the valve, said bonnet including means continuously encircling said indicator element and coacting therewith to anchor said translatable assembly against rotation, and said translatable assembly defining a passage for valve closing fluid continuously connecting the outer portions of said inner and outer power cylinders so that the forces of fluid pressure on the outer faces of both power pistons work cumulatively to force said translatable assembly inward to effect closing of the valve.

References Cited

UNITED STATES PATENTS

| Re. 19,151 | 5/1934 | Saunders | 251—331 |
|---|---|---|---|
| 2,683,580 | 7/1954 | Griswold | 251—31 |
| 3,310,282 | 3/1967 | Boteler | 251—331 |

ARNOLD ROSENTHAL, Primary Examiner.

U.S. Cl. X.R.

251—31, 63.5, 331, 368